(12) United States Patent
Schoenberg

(10) Patent No.: US 10,341,402 B1
(45) Date of Patent: Jul. 2, 2019

(54) CONNECTING CONSUMERS WITH PROVIDERS OF LIVE VIDEOS

(71) Applicant: Roy Schoenberg, Boston, MA (US)

(72) Inventor: Roy Schoenberg, Boston, MA (US)

( * ) Notice: Subject to any disclaimer, the term of this patent is extended or adjusted under 35 U.S.C. 154(b) by 0 days.

(21) Appl. No.: 15/725,491

(22) Filed: Oct. 5, 2017

Related U.S. Application Data

(63) Continuation of application No. 14/180,499, filed on Feb. 14, 2014, now Pat. No. 9,787,737, which is a continuation of application No. 13/024,289, filed on Feb. 9, 2011, now Pat. No. 8,694,612.

(60) Provisional application No. 61/302,847, filed on Feb. 9, 2010.

(51) Int. Cl.
*H04L 29/06* (2006.01)
*H04L 12/58* (2006.01)

(52) U.S. Cl.
CPC .............. *H04L 65/60* (2013.01); *H04L 51/00* (2013.01)

(58) Field of Classification Search
None
See application file for complete search history.

(56) References Cited

U.S. PATENT DOCUMENTS

| | | | |
|---|---|---|---|
| 5,911,687 A | 6/1999 | Sato et al. | |
| 6,223,165 B1 | 4/2001 | Lauffer | |
| 6,519,570 B1 | 2/2003 | Faber et al. | |
| 6,546,372 B2 | 4/2003 | Lauffer | |
| 6,549,889 B2 | 4/2003 | Lauffer | |
| 6,801,899 B2 | 10/2004 | Lauffer | |
| 6,957,218 B1* | 10/2005 | Wyatt | G06F 17/3089 |
| 7,124,186 B2 | 10/2006 | Piccionelli | |
| 7,308,422 B1 | 12/2007 | Faber et al. | |
| 7,412,396 B1 | 8/2008 | Haq | |
| 7,590,550 B2 | 9/2009 | Schoenberg | |
| 2001/0051765 A1* | 12/2001 | Walker | A61B 5/1112 600/300 |
| 2002/0010608 A1 | 1/2002 | Faber et al. | |
| 2002/0049684 A1* | 4/2002 | Nagamoto | A61B 5/0002 706/1 |
| 2004/0103120 A1 | 5/2004 | Fickle et al. | |
| 2004/0215491 A1* | 10/2004 | Clark | G06Q 30/02 705/2 |
| 2007/0083627 A1* | 4/2007 | Mohammed | H04L 67/16 709/223 |

(Continued)

OTHER PUBLICATIONS

Office Action in corresponding U.S. Appl. No. 13/024,289, dated Apr. 25, 2013, pp. 1-12.

(Continued)

*Primary Examiner* — Ajit Patel
(74) *Attorney, Agent, or Firm* — Fish & Richardson P.C.

(57) ABSTRACT

A computer-implemented method includes receiving by one or more computer systems, a request from a client system of a consumer for a live, real-time video having specified attributes of a performance embedded in the live, real-time video; searching by the one or more computer systems a database of attributes of performances associated with live, real-time videos; and causing by the one or more computer systems a connection between the client system of the consumer with a system of a provider of a live, real-time video captured performance based on the specified attributes included in the request for the live, real-time video.

26 Claims, 6 Drawing Sheets

(56) References Cited

U.S. PATENT DOCUMENTS

2007/0179819 A1 8/2007 Bradley et al.
2007/0250611 A1* 10/2007 Bhogal ............ G06F 17/30861
709/223

OTHER PUBLICATIONS

Response to Office Action dated Apr. 25, 2013 in corresponding U.S. Appl. No. 13/024,289, dated Jul. 24, 2013, pp. 1-10.
Final Office Action in corresponding U.S. Appl. No. 13/024,289, dated Aug. 12, 2013, pp. 1-11.
Response to Final Office Action dated Aug. 12, 2013 in corresponding U.S. Appl. No. 13/024,289, dated Nov. 18, 2013, pp. 1-9.
Notice of Allowance in corresponding U.S. Appl. No. 13/024,289, dated Dec. 2, 2013, pp. 1-7.
Amendment after Notice of Allowance dated Dec. 2, 2013 in corresponding U.S. Appl. No. 13/024,289, dated Jan. 10, 2014, pp. 1-8.
Response to Notice of Allowance dated Dec. 2, 2013 in corresponding U.S. Appl. No. 13/024,289, dated Feb. 3, 2014, pp. 1-2.
Final Office Action in corresponding U.S. Appl. No. 14/180,499, dated Jan. 6, 2017, pp. 1-12.
Response to Final Office Action dated Jan. 6, 2017 in corresponding U.S. Appl. No. 14/180,499, pp. 1-11.

* cited by examiner

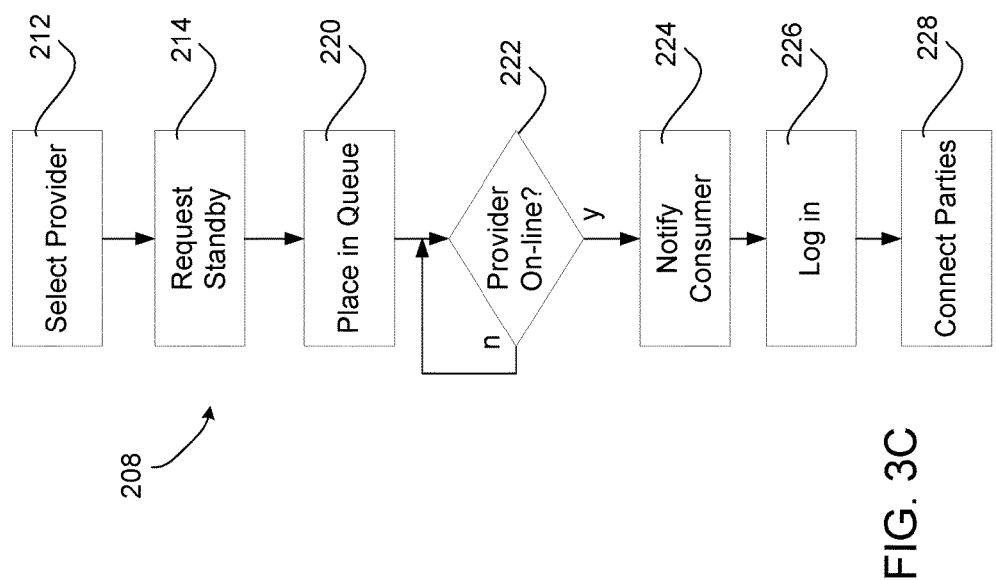

CONNECTING CONSUMERS WITH PROVIDERS OF LIVE VIDEOS

CLAIM OF PRIORITY

This application is a continuation and claims priority under 35 U.S.C. § 120 to U.S. patent application Ser. No. 13/024,289, filed Feb. 9, 2011, which claims priority under 35 U.S.C. § 119(e) to provisional U.S. Patent Application 61/302,847, filed on Feb. 9, 2010, the entire contents of each of which are hereby incorporated by reference.

BACKGROUND

The present invention is directed to connecting consumers with service providers. Systems have been developed to connect consumers and service providers over the Internet and the World Wide Web. Some systems use e-mail messaging and web-based forms to increase the level of connectivity between a consumer and a service provider. The consumer sends an e-mail or goes to a website that generates and sends a message (typically an e-mail or an e-mail type message) to a local provider. Another system is a brokerage type of system as described in U.S. Pat. No. 7,590,550.

SUMMARY

In one aspect of the present disclosure, a computer-implemented method includes receiving by one or more computer systems, a request from a client system of a consumer for a live, real-time video having specified attributes of a performance embedded in the live, real-time video; searching by the one or more computer systems a database of attributes of performances associated with live, real-time videos; and causing by the one or more computer systems a connection between the client system of the consumer with a system of a provider of a live, real-time video captured performance based on the specified attributes included in the request for the live, real-time video.

Implementations of the disclosure may include one or more of the following features. In some implementations, the live, real-time video includes a live, theatrical performance video. In other implementations, the live, real-time video includes a live, adult entertainment video. The method also includes establishing a communication channel between the consumer and the provider of the live, real-time video. The method may also include receiving a request to stream the live, real-time video to a computing device associated with the consumer, wherein a computing device of the provider is instructed to begin streaming the live, real-time video to the computing device associated with the consumer, following receipt of the request.

In another aspect of the disclosure, a computer-implemented method includes: receiving a request from a client system of a consumer to view a live, real-time video associated with one or more attributes in a set of attributes that define a suitable, live, real-time video; identifying by a computer system one or more available providers streaming one or more live, real-time videos satisfying at least some of the attributes in the set of attributes; receiving a selection of a particular provider; and establishing, by the computer system between the client system of the consumer and a system of the selected provider, a real-time communication channel through which the consumer views the live, real-time video. Implementations of this aspect of the present disclosure can include one or more of the foregoing features.

In yet another aspect of the disclosure, one or more machine-readable media are configured to store instructions that are executable by one or more processing devices to perform functions including receiving a request from a client system of a consumer for a live, real-time video having specified attributes of a performance embedded in the live, real-time video; searching a database of attributes of performances associated with live, real-time videos; and causing by the one or more computer systems a connection between the client system of the consumer with a system of a provider of a live, real-time video captured performance based on the specified attributes included in the request for the live, real-time video. Implementations of this aspect of the present disclosure can include one or more of the foregoing features.

In still another aspect of the disclosure, an electronic system includes one or more processing devices; and one or more machine-readable media configured to store instructions that are executable by the one or more processing devices to perform functions including: receiving a request from a client system of a consumer for a live, real-time video having specified attributes of a performance embedded in the live, real-time video; searching a database of attributes of performances associated with live, real-time videos; and causing by the one or more computer systems a connection between the client system of the consumer with a system of a provider of a live, real-time video captured performance based on the specified attributes included in the request for the live, real-time video. Implementations of this aspect of the present disclosure can include one or more of the foregoing features.

All or part of the foregoing may be implemented as a computer program product including instructions that are stored on one or more non-transitory machine-readable storage media, and that are executable on one or more processing devices. All or part of the foregoing may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

BRIEF DESCRIPTION OF THE FIGURES

FIGS. 2, 3A-3C and 5 are flow charts of processes used in an engagement brokerage system.

DETAILED DESCRIPTION

Overview

The system described below provides an integrated information and communication platform that enables consumers of services to identify and prioritize service providers streaming or otherwise providing (i.e., making accessible over a network) live video and/or live audio for the consumer to view and/or hear. Consumers at clients systems are able to interact on-line with a service provider, at a mutually convenient time and place, even when the two parties are geographically separated. This integrated platform is referred to herein as an engagement brokerage service (brokerage).

Figure 1:
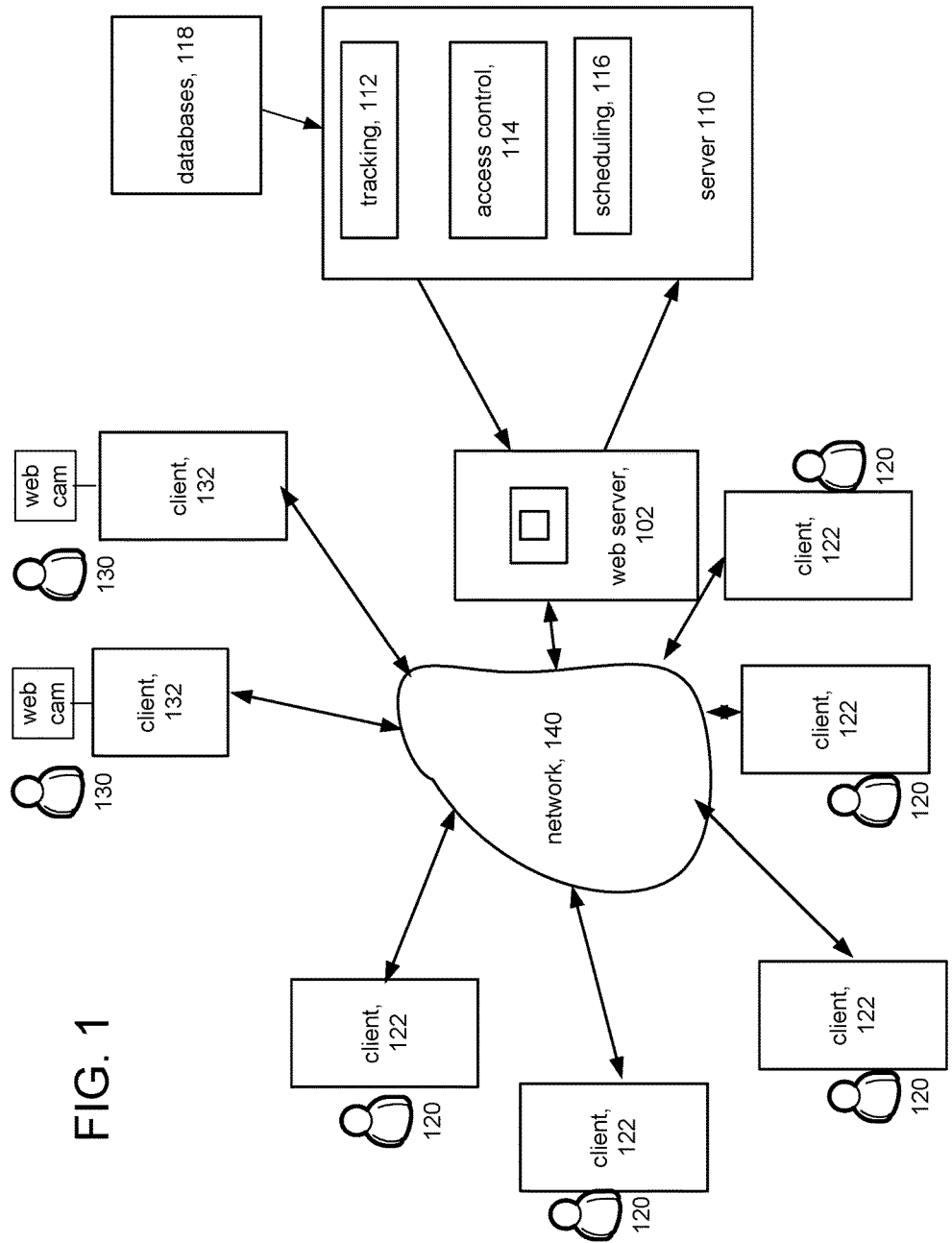
FIG. 1 is a diagrammatic view of an engagement brokerage service.

FIG. 1 shows an example system 100 of the engagement brokerage system for live video and/or live audio. The system 100 includes a computerized system or server 110 for making connections between consumers 120, at client systems 122, and service providers 130, at client systems 132 including, e.g., web cams or the like over a network 140, e.g., the Internet or other types of networks. The computerized system 110 may operate as a service running on a web server 102.

The computerized system 110 includes an availability or presence tracking module 112 for tracking the availability of the service providers 130. In an example, a service provider may be immediately or presently available to stream a real-time, live video to the consumer. That is, the brokerage system is configured to detect when a service provider associated with specified attributes (e.g., for the real-time, live video and/or associated with a real-time, live video that includes specified attributes) is presently available to provide the real-time, live video to the consumer.

Availability or presence is tracked actively or passively. In an active system, one or more of the service providers 130 provides an indication to the computerized system 110 that the one or more service providers are available to be contacted by consumers 120 and an indication of the mode by which the provider may be contacted. In some examples of an active system, the provider's computer, phone, or other terminal device periodically provides an indication of the provider's availability (e.g., available, online, idle, busy) to the system 110 and a mode (e.g., text, voice, video, etc.) by which the provider can be engaged. In a passive system, the computerized system 110 presumes that the service provider 130 is available by the service provider's actions, including connecting to the computerized system 110 or registering the provider's local phone number with the system. In some examples of a passive system, the system 110 indicates the provider 130 to be available at all times until the provider logs off, except when the provider is actively engaged with a consumer 120.

The computerized system 110 also includes one or more processes such as the tracking module 112 and a scheduling module 116. The system 110 accesses one or more databases 118. The components of the system 110 and the web server 102 may be integrated or distributed in various combinations.

Using the system 100, a consumer 120 communicates with a provider 130. The consumers 120 and providers 130 connect to the computerized system 110 through a website or other interface on the web server 102 using client devices 122 and 132, respectively. Client devices 122 and 132 can be any combination of, e.g., personal digital assistants, land-line telephones, cell phones, computer systems, media-player-type devices, and so forth. The client devices 122 and 132 enable the consumers 120 to input and receive information as well as to communicate via video, audio, and/or text with the providers 130.

Providers are, however, often available at times that are not convenient for their consumers, for example, in the event of a last-minute cancellation. Providers also may be available during otherwise idle times, such as when home. The brokerage supplements existing provider availability to allow whichever providers are available at any given time to provide live video/audio to consumers at their request. Instead of relying on the unlikely availability of a specific provider for any given consumer, the brokerage connects the consumer to all online providers capable of addressing the consumer's needs according to the matching of provider specific attributes specified by the consumer. The brokerage has distinct features including the ability to engage in live communication with a suitable, selectable provider and the ability to do so on-demand.

One advantage that the brokerage provides is that the brokerage constantly monitors the availability of a provider for an engagement. In order to achieve such a level of availability, the system assimilates the discretionary or fractional availability windows of time offered by individual providers into a continuous availability perception by consumers. Since many of the services offered to consumers are on-demand, consumers have little expectation that the same provider will be constantly available, rather, they expect that some provider will be available.

The computerized system 110 provides information and services to the consumers 120 in addition to connecting them with providers 130. The computerized system 110 includes an access control facility 114, which manages and controls whether a given consumer 120 may access the system 110 and what level or scope of access to the features, functions, and services the system 110 will provide.

The consumer 120 uses the system 100 to find out more information about a topic of interest. The computerized system 110 identifies service providers 130 that are available at any given moment to communicate with a consumer about a particular type of content. The computerized system 110 facilitates communication between the consumer 120 and provider 130, enabling them to communicate, for example, via a data-network-facilitated video or voice communication channel (such as Voice over IP), land and mobile telephone network channels, and instant messaging or chat. In some examples, the availability of one or more providers 130 is tracked, and at the instant a consumer 120 desires to connect and view the provider's live video and/or audio, the system 110 determines whether a provider is available. If a particular provider 130 is available, the system 110 assesses the various modes of communication that are available and connects the consumer 120 and the provider 130 through one or more common modes of communication.

The system selects a mode of communication to use based in part on the relative utility of the various modes. The preferred mode for an engagement is for both the consumer 120 and the provider 130 to use web-based consoles, as this allows each of the other modes to be used as needed. For example, consumers and providers may launch chat sessions, voice calls, or video chats from within a web-based console. If the provider 130 is not available, the system 110 identifies other available providers 130 that would meet the consumer 120's needs. The system 110 enables the consumer 120 to send a message to the consumer's chosen provider. The consumer can also have the system 110 contact the consumer in the future when the chosen provider is available.

Figure 2:
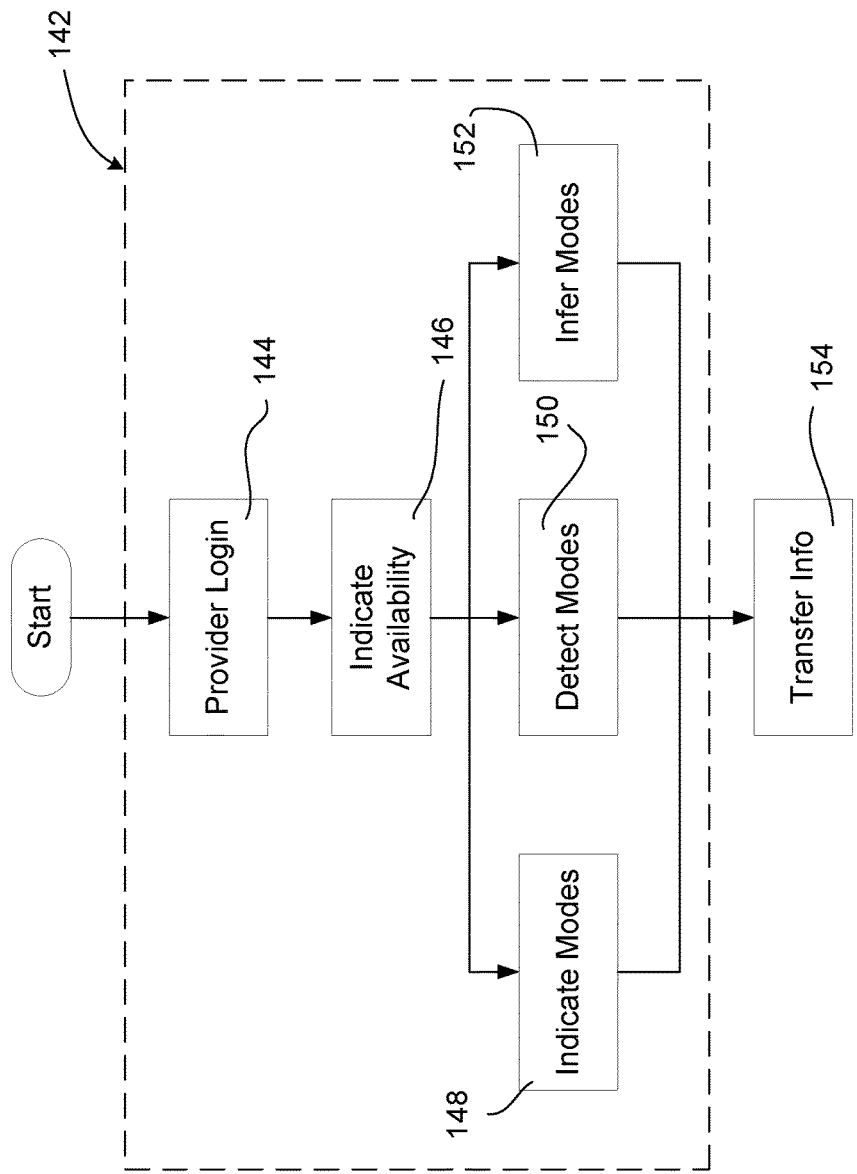

Referring now to FIG. 2, the computerized system 110 tracks 142 the availability of providers 130 and consumers 120. When a provider 130 logs 144 into the system 100, the provider 130 indicates 146 (such as by setting a check box or selecting a menu entry or by responding to a voice prompt) to the tracking module 112 that he or she is available to interact with consumers 120 and to broadcast his or her live video and/or audio. The provider 130 can also indicate 148 to the tracking module 112 (such as by setting a check box or selecting a menu entry or by responding to a voice prompt) the modes (e.g., telephone, chat, video conference) by which a consumer 120 can be connected to the provider 130. Alternatively, the tracking module 114 determines 150 the capabilities of the terminals 122 and 132 the consumer 120 and the provider 130 use to connect to the system (for example, by using a terminal-based program to analyze the hardware configuration of each terminal). Thus, if a provider 130 connects to the system 100 by a desktop computer and the provider has a video camera connected to that computer, the tracking module 112 determines 150 that the provider 130 can be engaged by text (e.g., chat or instant messenger), voice (e.g., VoIP) or video conference. Similarly, if a provider 130 connects to the system using a handheld device such as a PDA, the tracking module 112 determines 152 that the provider 130 can be engaged by text or voice. The tracking module 112 can also infer 152 a provider's availability and modes of engagement by the provider's previously provided profile information and the terminal device through which the provider connects to the system.

Providers participating in the brokerage network can have several states of availability over time. States in which the provider may be available may include on-line, in which the provider is logged-in and can accept new engagements in any mode, on-line (busy), in which the provider is logged-in but is currently occupied in a video or telephonic engagement, and scheduled, in which the provider is offline but is scheduled to be online at a designated time-point and can pre-schedule engagements for it. While not online, the provider can take messages as in offline state. Other states may include off-line, in which the provider is not logged in but can take message-based engagements (i.e., asynchronous engagements), out-of-office, in which the provider is not accepting engagements or messages, and standby, in which the provider is offline and can be paged to Online status by the brokerage network if traffic load demands it (in some examples, consumers see this state as offline).

The operating business model for the provider network employs a remuneration scheme for providers that helps assure that the consumers can find providers in designated professional domains in the online mode. For example, selected providers can be remunerated for being in the standby mode to encourage their on-line availability in case of low discretionary availability by other—providers in their professional domain. Standby providers are also called into the on-line state when the fraction of on-line (busy) providers in their professional domain exceeds a certain threshold. In some examples, the transition of providers from standby to online and back to standby (in case of over capacity or idle capacity) is an automated function of the system.

The tracking module 112 transfers 154 information about the availability and the communication capability of the consumers 120 and the providers 130 to the scheduling module 116 using, for example, one or more well-known presence protocols, such as Instant Messaging and Presence Service (IMPS), Session Initiation Protocol (SIP) for Instant Messaging and Presence Leveraging Extensions (SIMPLE), and the Extensible Messaging and Presence Protocol (XMPP).

As noted, the system 100 includes access control facilities 114 that control how consumers 120 access the system and to what extent or level the services provided by the system are made available to consumers. The system 100 also stores and provides access to consumer information (e.g., contact information, and preference/profile information to be described later). However, other consumer information would typically be kept from the service provider such as credit and financial information, credit card information. Similarly, provider information (e.g., biographies, product and service information, and any information the provider wants to make available to consumers) can be made available. The access control facility 114 can prevent unauthorized access to this information.

The brokerage provides compensation for products and services provided. Access to the system 100 may be provided on a subscription basis, with consumers paying a fee (either directly or indirectly through another party) to be provided with a particular level of access to the system. In exchange for providing products or services, the service provider may receive compensation from the consumer. In one embodiment, the consumer pays the operator, which keeps a portion (e.g., a percentage payment or a flat fee) and pays the remainder to the service provider. In another embodiment, the consumer or the service provider pays a flat fee or percentage of the fee for the engagement to the operator. The operator may be paid a flat fee or a percentage of the fee for the engagement transaction. Alternatively, the consumer or the service provider or both may pay a fee (a service fee) to the operator for providing the connection.

The Consumer Interface

Initiation of an Engagement

A consumer 120 engages with the brokerage system 100 to access a service provider 130. Several types of engagements may exist. Examples of these are described with respect to flowcharts in FIGS. 3A to 3C.

Figures 3A, 3B:
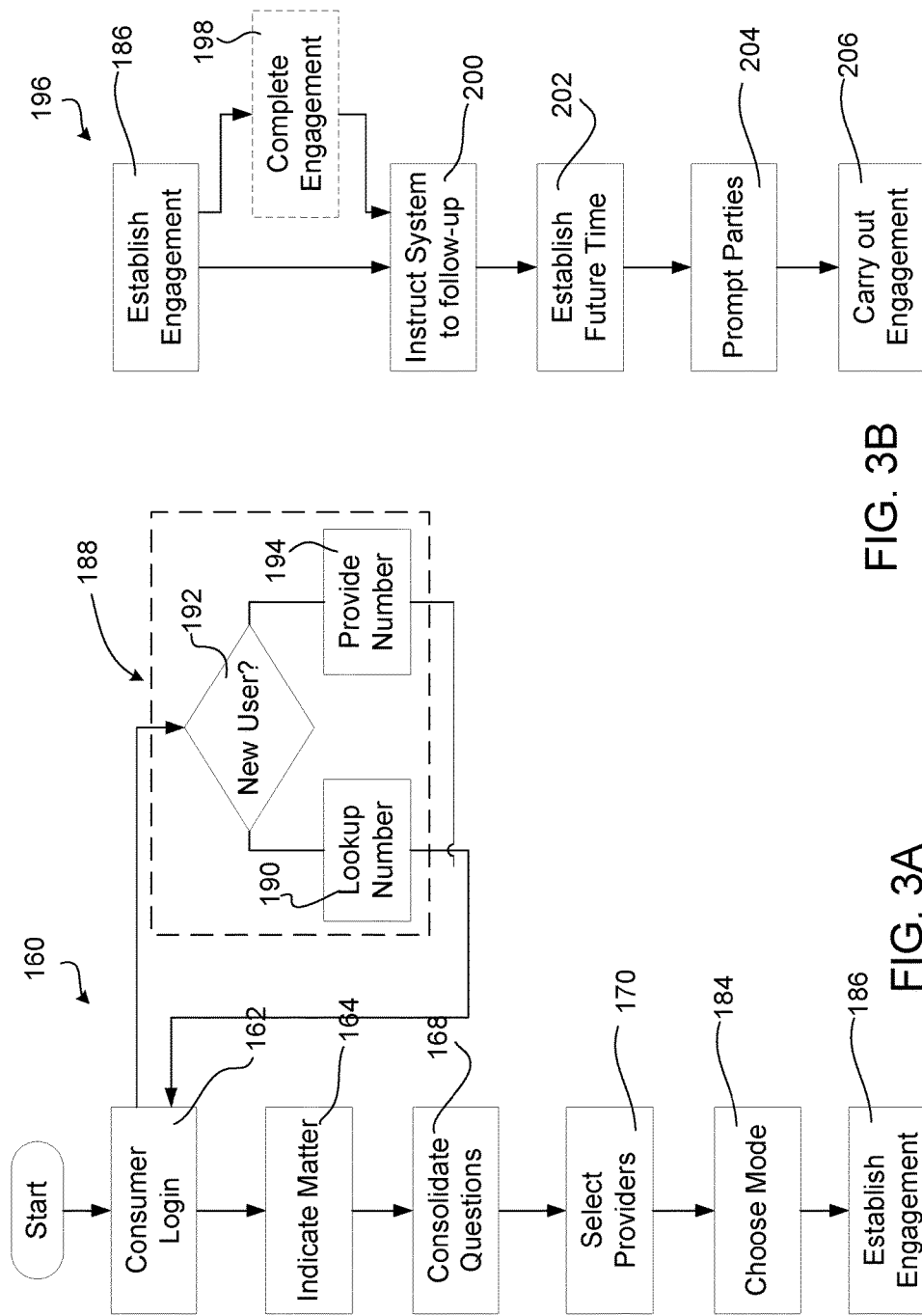

Referring now to FIG. 3A, a process 160 for establishing a consumer-initiated engagement is shown. In a consumer-initiated engagement, a consumer logs in 162 and communicates 164 the type of live video or audio the consumer wishes to view. A component of the brokerage system 100 assists the consumer in consolidating 168 the types of live video or audio the consumer wishes to view and helps select 170 the appropriate providers. A web page includes some initial questions, and another web page provides a user interface for entering additional criteria to find a provider. A results page allows the consumer to select a specific provider from a list of providers identified based on the search criteria. Once a provider is selected and a mode of engagement is chosen 184, the scheduling module 116 establishes 186 the engagement. In some examples, the brokerage associates 188 a unique identifier with participating consumers which can be used in subsequent interactions with the brokerage. The system can assign to a consumer a brokerage membership number or other similar, pre-existing identification 190. If the consumer does not already have 192 a number, one is generated 194. The unique identifier can be used by the consumers to save their planned engagement for later retrieval.

Referring now to FIG. 3B, a process 196 for establishing a follow-up or prescheduled engagement is shown. Once an engagement is established 186 as in FIG. 3A or as one is completed 198, the two parties can instruct 200 a component of the system 100, such as the scheduling module 116, to pursue the established engagement or a follow-up engagement at pre-defined schedules or at future time points. The system uses 202 e-mail, automated telephone communication, or any other method of communication to establish a convenient time for both parties to accomplish the follow-up and then prompts 204 them to do so 206.

Referring now to FIG. 3C, a process 208 for a standby engagement is shown, with a user interface on a web page 210. A standby engagement is similar to a consumer-initialized engagement. In a standby engagement, the consumer selects 212 a provider 180 or type of provider and requests 214 that a component of the system 100, such as the scheduling module 116, to notify the consumer by an appropriate communication, for example, e-mail, text message, or an automated phone call, when the selected provider is online and accepting engagements. In one particular example, the user has chosen to be called and input a phone number and a limit as to how long the user will wait. The consumer request is placed 220 in a queue for the specific requested provider who is off-line (or for a type of provider for which all qualified providers are off-line). When the system determines 222 that the provider is available, the system notifies 224 the consumer. When notified, the consumer logs in 226 and is connected 228 to the provider.

As an option, a standby list for a provider may provide preferential queuing for some consumers. For example, preferential queuing may be provided based on prior engagements with the provider (e.g., preference is given to follow-up engagements) or based on a service tier (e.g., frequent user status) of that consumer. The brokerage can be configured such that it collects information about the consumer (e.g., answers to initial intake questions) and provides the collected information to the specific service provider prior to initiating any further engagements. For example, a consumer can store information during a consumer-initiated engagement as described above, park the information, and wait to be contacted when the specific selected provider is available.

Provider Selection

While the system can assist the consumer in identifying the most appropriate providers, it also allows the consumer to filter the provider list based on the consumer's preferences and access a view of a provider availability matrix that changes as providers go on and off line.

Various criteria can be used to filter the available providers. Basic details indicate the consumer's preference for the type and gender of the provider and what modes of communication the consumer wants to be able to use. The user can also specify demographics including location and languages spoken. Qualifications may include years of experience and various other criteria. A consumer can also use a search box to search for a provider by name.

Consumers may select providers according to the type of live video/audio being broadcast and attributes of the provider, such as a geographical area where the provider is located. Any metrics within the provider profile (discussed below) can be used to define a list of providers that meet the consumer's preferences.

Once the consumer enters her search criteria 176, the results are shown on the web page. As mentioned, a list of providers is presented. This list may indicate each providers name and rating and whether the provider is available. For the selected provider, additional details are shown, including picture of the user, specialty, demographic information, what types of connections the user can use for an engagement, and personal information. Tools allow the consumer to initiate or schedule an engagement and/or view a live video/audio.

Providers already associated with the consumer may appear on the consumers' short list. When reviewing the list of historical engagements, consumers are able to access the engagement audit and the ranking they have attributed to any engagements in the past.

Once a consumer has defined a collection of criteria to filter and find a provider, the system can offer tools to shorten the process in the future. Consumers may be able to save criteria-sets as named searches and benefit from notifications when a search list surpasses a certain level of availability that may encourage the consumer to log in and communicate with a provider.

Modes of Engagement

The brokerage allows consumers to engage provider's "on demand" based on provider availability. Engagements can be established in various ways, including:

Asynchronous correspondence—provider interaction by way of secure messaging. The question or topic of the engagement is sent to a selected provider (whether online or not) and is answered by this provider at the provider's leisure. Turnaround times are monitored by the system and are part of the credentials of the provider used for selection by consumers. The system informs the consumer once a response has been received and can allow the consumer to redirect the question if the consumer needs more urgent response time. For example, typical types of asynchronous correspondence include e-mail, instant messaging, text-messaging, voice mail messaging, VoIP messaging (i.e., leaving a message using VoIP), and paper letters (e.g., via the U.S. Postal Service).

Synchronous correspondence—Several forms of synchronous correspondence allow the consumer and the provider to engage in real-time discussions.

Synchronous text correspondence—This may be referred to as a "Chat" module where both sides of the engagement type their entries in response to each others' entries. The form of communication may be entirely text based but is still a live communication. Examples include instant messaging and SMS messaging.

Web-based streaming live video—The use of broadband network connections allows for real-time voice and video transmission over the Internet. Web-based teleconferencing may use VoIP, SIP, and other standard or proprietary technologies. Small digital cameras, referred to as webcams, attached to or built in to personal computers or laptops can be used for this purpose and can be provided by standard software or by custom software provided by the brokerage. Alternatively, dedicated video conferencing communication equipment or telephones with built-in video capabilities can be used.

Engagement Redirection

In some examples, a consumer redirects an active engagement to another provider or provider type. A consumer may also redirect an engagement to employ a different mode of communication with the current provider (e.g., move from a text chat to a phone conversation).

Provider Enrollment

Service providers are the individuals responding to consumers queries and participating in engagements and streaming live video/audio over the network. Providers agree to the terms of the brokerage, such as payment for their time in performing engagements, the protocol of conduct desired, and the ramification and distribution of liability in case of violations of that protocol.

Figure 4:
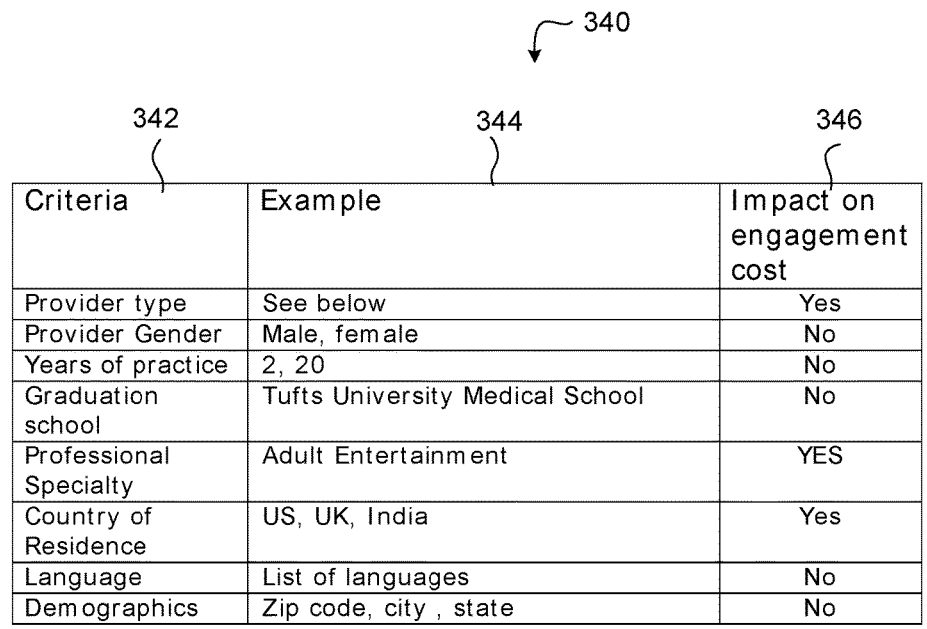
FIG. 4 is a table of sample criteria used in an engagement brokerage system.

Prior to joining the brokerage network, a provider establishes a profile that that is searchable by consumers. The profile is used for several purposes, including determining the relative cost of the provider's time to either the consumer or the brokerage sponsor, and providing consumers with information that may be relevant to their choice to engage one provider versus another. Some information about the provider is verified by the brokerage (e.g., Tax ID, education, professional certification, demographics, and contact information), and some is acquired during the provider's participation on the brokerage. Such data may include length of service, number of engagements, consumer satisfaction, projected availability, etc. A provider may also provide a general introductory note, a picture, and voice and video welcome snippets. Providers may also add other information they deem relevant for consumers (e.g., a list of publications and honorary appointments) A table 340 in FIG. 4 lists example profiling criteria that can be populated during enrollment. The table 340 includes example criteria 342, specific examples 344 of each criterion 342, and an indication 346 of whether that criterion would have an impact on engagement cost.

Individual service providers are also able to register and enroll with the system. Individual service providers are independent service providers not affiliated with a provider network.

As part of the provider selection process described above, consumers benefit from access to introductory material from the provider. As consumers search for providers to meet their needs, they can select to view only providers where such material is available, producing an incentive for providers to take advantage of such capability.

Provider Ratings

To further improve the ability of consumers to choose appropriate service providers, the brokerage includes a utility for rating the products and services provided by the service providers or by a service provider network. The consumers provide feedback (positive and negative) to the system about the products and services provided by a particular service provider. In addition, the service providers provide feedback and evaluations of the products and services provided by other service providers.

As part of the provider profile (and as a way for consumers to limit their search), the system continuously updates each provider's profile with metrics reflecting the quality of his or her interaction with consumers. The metrics are updated at the conclusion of every engagement to allow providers immediate feedback as to their level of service. In some examples, all searches for providers on the system are sorted by provider rating by default, promoting higher-quality providers. Example parameters to be updated and taken into account in setting the rating include consumers' overall ranking of the provider's engagement quality, the number of engagements made by this provider in the last 30 days or overall, the number of returning engagements as a fraction of all engagements for that provider, the number of redirected engagements from this provider to another, and the average turnaround time for messaging while not "out-of-office." In addition to the ratings each provider on the system has a Provider Statistic Manifest stating operational statistics that may interest consumers, such as that provider's availability for phone conferences over the last 30 days.

Consumers are asked to rank a provider at the end of the engagement as part of the process of disconnecting. To encourage consumers to provide such feedback, charges for the engagement continue to accrue until the consumer completes the ranking. Such a process helps encourage provider engagements to end with a ranking entry, promoting a higher quality of service to the brokerage's consumers.

The Provider Console

Providers interact with consumers through a provider console web page. This interface is similar to that used by the consumers. The provider console provides access to the various tools used by providers. A window interface shows a live image of the consumer, provided via a web cam for example on the consumers system with tools to control or disable the video feed. A phone control allows the provider to initiate a phone call with the consumer. A log of an ongoing chat is displayed above an input for the provider's next comment. Other tools are available in tabs on the side, such as accesses to the terms of operation and the legal policies of the brokerage, such as disclaimers. State setting allows the providers to change his availability state between states such as off-line, on-line and out-of-office. Scheduling allows providers to update their availability calendar with future times they expect to be available on the system, which can in turn result in consumers seeing a "scheduled" state for such providers.

Messaging tools allow providers to correspond with consumers in message-based engagements. The console also allows the provider to participate in chat engagements where the consumer and the provider communicate back-and-forth in real-time by typing. The brokerage allows a single provider to engage in more than one chat at a time to maximize his yield while consumers are typing their entries. The chat feature also allows the provider to forward specific lists of questions to further reduce the need for his time in acquiring information from the consumer at the beginning of an engagement. Tools available to assist the provider in chat or messaging may include a thread viewer, the consumer's engagement history, a communication timeline chart, and a library of built-in and self-produced message templates for quick response. Such templates may also include references, links, and embedded graphical educational content on prevalent topics. In some examples, the brokerage scans outbound messages for inappropriate language based on the sponsor's preferences.

The console allows the provider to hold a voice conference engagement with the consumer when the consumer is using either her computer or a telephone. The provider can use the console to redirect his end of the conference to a phone, for example, if bandwidth or other considerations indicate it or simply based on personal preference. The console also allows the provider to engage in video conferences with consumers. Audio may be served via the console or be may redirected to a telephone. To verify a provider's identity when using the telephone for a voice engagement, the system provides the provider with a PIN number through the provider console. When the provider calls into the system, or answers the phone when called by the system, the provider enters the PIN to confirm that the person on the phone is the same person who is logged into the console. This method is also used to leave secure voice message. When a provider wants to leave a message for a consumer, the provider tells the console and receive a PIN. The provider then receives a call from the system, enters the PIN, and leaves a message. The message is then delivered to the consumer with assurances that it was left by the provider.

The provider is able to review his account status, system settings, and preferences. The provider can also access his profile and user satisfaction and statistics as they are available to consumers. The console also connects to financial services associated with the provider's participation in the brokerage. This includes status of charges. The brokerage offers providers the ability to redirect messages or requests for appointment to SMS-compatible cellular phones. In this mode, the provider associates a cell phone number with his account and establishes the type of information that the system can send to the mobile device. Such information may include engagement-related notifications as well as system-related notifications (e.g., an announcement about a high-traffic state asking providers to make themselves available and offering a higher fee to do so).

Sample Use Cases in the Field of Live Video

Providers of real-time live videos may want generate income or other revenue by making their real-time, live videos accessible to consumers over the network. Using the techniques described herein, providers at their discretion become "available" on the brokerage system 100. In some examples, when a provider becomes "available," this provider availability indicates that the provider will be streaming or otherwise providing over the network a real-time, live video.

The brokerage system 100 determines the real time, discretionary availability of the providers. Based on this determination, the brokerage system 100 matches a consumer with an available provider and establishes a connection (e.g., a communication channel) between the consumer and the provider. Specifically, brokerage system 100 matches consumers 120 of real-time, live videos and audio (collectively referred to as "video" herein, without limitation, and for the purposes of convenience) with providers 130 of live videos based on consumer specified attributes for the type of live video the consumer would like to view in real-time. The system 100 enables the consumer 120 to search for providers 130 who are providing (for example, by streaming) live videos at the time the consumer 120 is searching and enables the consumer 120 to engage a provider 130 on a transactional basis or for a one-time viewing of the provider's live video. In some embodiments, more that one consumer 120 can access the same live video at that same time, whereas in other embodiments that access can be exclusive or private, possibly obtaining a premium fee.

Using an electronic motion picture acquisition device (e.g., video-camera, mobile device, and BlackBerry™) (collectively referred to as "video camera" herein, without limitation, for the purposes of convenience) and a client system 132, providers, actors, consumers and other various individuals (collectively referred to as "actors 130" herein, without limitation, for the purposes of convenience) provide over a network (e.g., the Internet or an intranet) a live video of the actor performing various actions, including cooking, singing, dancing and engaging in various forms of adult entertainment, e.g., erotic activities. The video camera records the actor's actions as real-time images and/or as a real-time data stream. The actor's client system 132 sends the real-time images and/or real-time data stream over the network 140 to a consumer's client system 122, enabling the consumer 120 to view a live video of the actor's actions in real-time over the client system 122.

Figure 5:
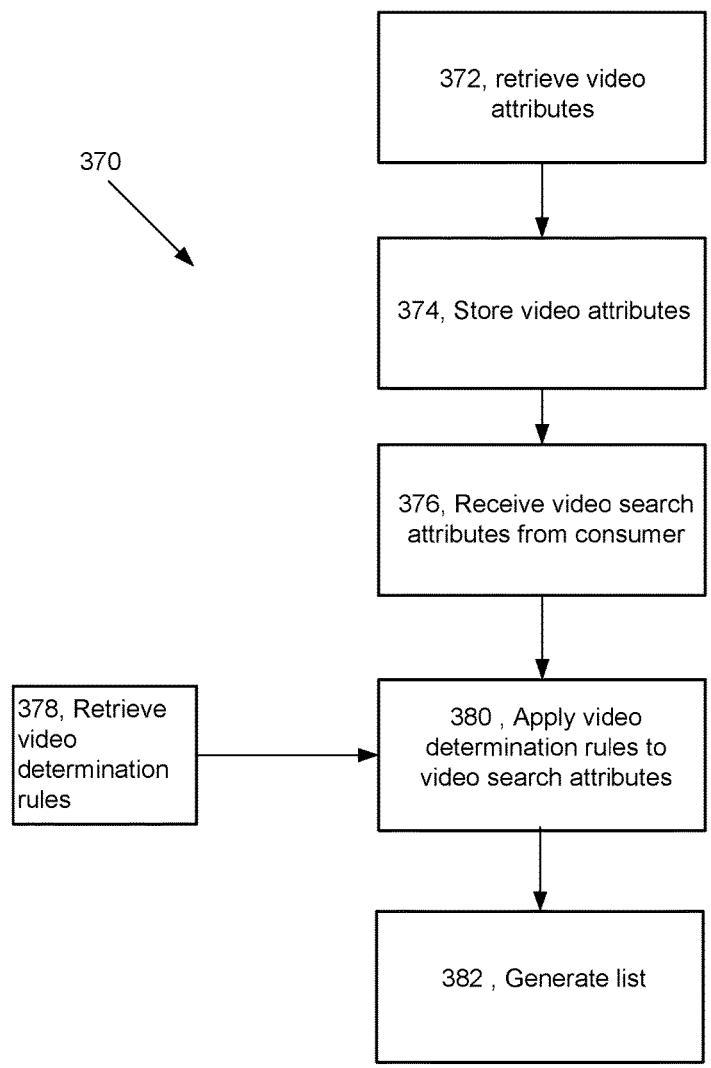

Referring to FIG. 5, the server 110 matches 380 a consumer 120 with an actor 130 by performing and executing various processes. The server 110 receives 372 from the actor 130 an instruction, data string or electronic message (collectively referred to as "electronic message" herein, without limitation, and for the purpose of convenience) including attributes of a performance that will be embedded in the video performance indicative of the type of live video the actor is currently streaming over the network 140 (hereinafter "attributes" or "video attributes"), as discussed in further detail below or anticipates to provide at specified time. The server 110 stores 374 the attributes of the video performance. The server 110 receives 376 the attributes of the performance (hereinafter "search attributes") from the consumer 120, as discussed in further detail below. The server 110 retrieves 378 from the database 118 or other data repository "video determination" rules. The server 110 applies 380 the video determination rules to the video search attributes, as discussed in further detail below, to determine live videos with video attributes matching the video search attributes. The server 110 also generates 382 a list of live videos with video attributes matching the video search attributes.

To make a live video accessible in real-time through the brokerage system 100 to consumers 120, an actor 130 registers with the brokerage system, for example, by sending the brokerage system 100 an instruction or an electronic message (e.g., electronic mail messages, text messages or short message service ("SMS") messages) including the video attributes indicative of the type of live video the actor is streaming over the network 140. The video attributes also specify a date and a time for which the live video is provided in real-time. The video attributes include keywords, a text description, data tags and time and date information for when the actor is providing the live video.

In one particular example, the actor 130 sends the server 110 an electronic message specifying that the actor is providing a live cooking video on Jan. 11, 2010 from 10 am to 12 pm. In this example, the keywords include "cooking, food, chef, and gourmet." In another example, the actor 130 sends the server 110 an electronic message specifying that the actor is providing a live pornographic video on Feb. 2, 2010 from 9 pm to 11 pm. In this example, the keywords include "pornography, voyeur, erotic and sex." Additionally, the video attributes also include a description of the type of live video. An example description includes "a live video of the actor undressing and dancing in a provocative manner." The server 110 also includes keyword generation rules that generate a list of keywords based on the actor's entered description.

In another particular example, a provider streams over the network 140 a live video of a Broadway play, as the play takes place in real time. A consumer views the live play be searching the brokerage system 100 for live videos of various plays, using the techniques described herein. When the consumer selects a specific play the consumer wants to view, the brokerage system streams the real-time video feed of the Broadway play to the consumer's system 122. The examples provided hereinafter related to the adult entertainment industry, for purposes of convenience. The techniques described herein are applicable, without limitation, to other industries, businesses and sectors, including for example the culinary sector.

The database 118 includes "live video entries" (e.g., a record or file for an actor's live video). A live video entry is associated with or linked (e.g., through a pointer) with the video's attributes (e.g., data indicative of the type of live video and the date and time of the real-time performance.) When the server 110 receives the actor's electronic message, the server 110 generates a live video entry for the actor's live video. The server 110 parses the electronic message for the video's attributes indicative of the type of live video (e.g., the keywords) and indicative of the date and time of the performance. Based on the parsed attributes, the server 110 generates "video database entry" attributes corresponding to the attributes included in the electronic message. The video database entry attributes are linked to the live video entry.

To search for live videos, a consumer 120 accesses the brokerage system 100 over the network 140 and sends the server 110 an electronic message including search attributes (e.g., keywords or a text description) of the type of live video the consumer 120 wants to view. The server 110 generates a graphical user interface that when rendered on a display device renders a visual representation of search fields (e.g., text boxes). The consumer inputs into the search fields the various search attributes (e.g., keywords or a written description) for the type of live video the consumer wants to view. In one particular example, the consumer 120 inputs the following attributes into the search fields: "live pornographic, sex video." The search attributes are sent from the consumer's client system 122 over the network 140 to the server 110.

The server 110 receives the search attributes, retrieves "video determination" rules from the database 118 or other data repositories and executes the video determination rules to determine live videos associated with at least some of the search attributes specified in the search fields. The video determination rules compare the search attributes to the video database entry attributes linked or associated with a live video entry in the database 118. When the search attributes match (e.g., exact match, similar match or some variation thereof) the video database entry attributes, the server 110 determines a "matched video database entry," a video that the consumer 120 may be interested in viewing. In the example described above where the search attributes include "live pornographic, sex video," the server 110 determines through the application of the video determination rules actors who are streaming real-time, live pornographic and live sex videos.

The server 110 generates a list of live videos ("matched live videos") associated with attributes matching the consumer's search attributes based on the matched video database entries. The server 110 sends the consumer 120 the list of the matched live videos. The server 110 generates an electronic message including the list of the matched live videos and sends the electronic message to the consumer's client system 122. The server 110 also generates a graphical user interface that when rendered on a display device renders a visual representation of the list and a visual representation of the live videos included in the list. The live videos included in the list are associated with a link, selection of which causes establishes a connection between the consumer's client system 122 and the actor's client system 132. Through the connection, the consumer's client system 122 receives streamed data and/or real-time images from the actor's client system 132 that enables the consumer 120 to view in real-time the actor's live video. Additionally, through the connection, the consumer 120 also provides or streams a real-time, live video, enabling the consumer 120 and the actor 130 to both provide and view live videos simultaneously.

In another example, the real-time, live video is used to provide the consumer with content the consumer is interested in viewing. In an example, the live video does not being until the consumer selects to view the live-video and/or pays for the live video. For example, a provider of cooking lessons may being streaming a live video of the cooking lessons once a consumer has indicated an interested in viewing the live video on cooking lessons, for example, by purchasing the cooking lessons. In another example, the live video has already begun streaming and/or is periodically streaming. In this example, the consumer selects to view the real-time video and views the real-time video, e.g., that is already in progress and has already begun streaming.

In another example, the real-time, live video may be provided as part of benefits that an employer provides to employees. In this example, the employer may host a web site that allows employees to search for certain types of live, real-time videos, including, e.g., videos that match certain pre-defined attributes as described herein.

In an example, an employer hosts a website that enables employees to search for cooking videos, training videos (e.g., computer programming training videos, CPR training videos, and so forth), and other video that enable the employee to enhance the employee's skills. Although the above examples are with regard to employers and employees, the above examples are generally applicable to any other types of entities.

In an example, the techniques described herein are equally applicable for searching for service providers satisfying pre-defined attributes. The system determines a service provider that is presently available to provide a consultation and/or live video, for example, using the attributes received from a consumer in a request. Additionally, while the foregoing techniques are described with regard to live, real-time video, the foregoing techniques are equally applicable to searching for providers for consultations and/or engagements, for example, based on attributes associated with the provider and/or with the engagement.

Embodiments can be implemented in digital electronic circuitry, or in computer hardware, firmware, software, or in combinations thereof. Apparatus of the invention can be implemented in a computer program product tangibly embodied or stored in a machine-readable storage device for execution by a programmable processor; and method actions can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD ROM disks. Any of the foregoing can be supplemented by, or incorporated in, ASICs (application-specific integrated circuits).

Other embodiments are within the scope and spirit of the description claims. For examples, the techniques described herein are application to all video types, including pre-recording videos. For example, due to the nature of software, functions described above can be implemented using software, hardware, firmware, hardwiring, or combinations of any of these. Features implementing functions may also be physically located at various positions, including being distributed such that portions of functions are implemented at different physical locations.

What is claimed is:
1. A computer-implemented method comprises:
receiving, by a brokerage service system, a request from a client system of a consumer for a provider having specified provider criteria to conduct a specific type of live performance, and with the request including specific performance attributes required in the specific type of live performance;
determining, by the brokerage service system, availability of providers associated with the brokerage service system having at least some of the specified provider criteria for conducting the specific type of live performance;

sending, by the brokerage service system, to the client system a response comprising a listing of live videos of available providers having at least some of the specified provider attributes to conduct the specific type of live performance, with the specific performance attributes; and causing, by the brokerage service system, establishment of a communication channel for electronic transmission of a live, real-time video of the performance of the selected provider, with the communication channel being between the client system of the consumer and a system of the selected provider of the live, real-time video.

2. The method of claim 1 wherein determining availability of providers associated with the brokerage service system, further comprises:

enabling the consumer to search for providers that are providing streaming live videos at the time the consumer is searching for providers.

3. The method of claim 1, further comprises:

retrieving, by the brokerage service system, video determination rules; and applying, by the brokerage service system, the retrieved video determination rules to video search attributes to determine live videos with attributes matching the specific performance attributes.

4. The method of claim 3 wherein a first one of the video determination rules is a compare rule that compares the received specific performance attributes to sets of attributes of corresponding live performances that are linked to or associated with corresponding live video entries in the data repository.

5. The method of claim 3 wherein the first one of the video determination rules is an exact match compare rule that determines exact matches between the received specific performance attributes and one or more of the sets of attributes of the corresponding live performances.

6. The method of claim 3 wherein the first one of the video determination rules is an approximate match compare rule that determines approximate matches between the received specific performance attributes and one or more of the sets of attributes of the corresponding live performances.

7. The computer-implemented method of claim 3 wherein the live, real-time video is selected from the group including a live, theatrical performance video, a live, adult entertainment video, a live training performance, and a live performance that had started prior to consumer selection.

8. The computer-implemented method of claim 1 wherein in the listing is a link, selection of which causes the brokerage service system to establish the communication channel.

9. The computer-implemented method of claim 1 wherein receiving the specific performance attributes embedded in the specific type of live performance occurs while the live performance is streaming.

10. The computer-implemented method of claim 1 wherein the data repository comprises a plurality of live video entry records each associated with at least a provider, and associated with and/or linked through a pointer to with attributes of the live video, with the attributes of the live video including data that are indicative of the type of live video, the date and time of the real-time performance of the live video.

11. The computer-implemented method of claim 10 further comprising:

receiving, by the brokerage service system, an electronic provider message corresponding to a live video;

generating, by the brokerage service system, a live video entry record from the received electronic provider message, by:

parsing the electronic provider message to extract live videos attributes indicative of the type of live video, and the date and time of the performance;

linking the video database entry attributes to the live video entry.

12. A computer program product tangibly stored in a machine readable hardware storage device, the computer program product comprising instructions to cause a machine to:

receive a request from a client system of a consumer for a provider to conduct a specific type of live performance;

determine availability of providers associated with a brokerage service for conducting the specific type of live performance;

send a response comprising a listing of available providers having specified provider attributes to conduct the specific type of live performance;

receive specific performance attributes that are embedded in the specific type of live performance; and cause establishment of a communication channel for electronic transmission of a live, real-time video that displays the performance of the selected provider, with the connection being between the client system of the consumer and a system of the selected provider of the live, real-time video.

13. The computer program product of claim 12 wherein instructions to determine availability of providers associated with the brokerage service system, further comprises instructions to:

enable the consumer to search for providers that are providing streaming live videos at the time the consumer is searching for providers.

14. The computer program product of claim 12, further comprises instructions to:

retrieve video determination rules; and apply the retrieved video determination rules to video search attributes to determine live videos with attributes matching the specific performance attributes.

15. The computer program product of claim 14 wherein a first one of the video determination rules is a compare rule that compares the received specific performance attributes to sets of attributes of corresponding live performances that are linked to or associated with corresponding live video entries in the data repository.

16. The computer program product of claim 14 wherein instructions to receive the specific performance attributes that are embedded in the specific type of live performance are executed prior to establishment of the communication channel.

17. The computer program product of claim 12 wherein instructions to receive the specific performance attributes that are embedded in the specific type of live performance are executed while the live video is streaming.

18. The computer program product of claim 12 wherein the data repository comprises a plurality of live video entry records each associated with at least a provider, and associated with and/or linked through a pointer to attributes of the live video, with the attributes of the live video including data that are indicative of the type of live video, the date and time of the real-time performance of the live video.

19. The computer program product of claim 12 further comprising instructions to:

receive an electronic provider message corresponding to a live video;

generate a live video entry record from the received electronic provider message, by instructions to:

parse the electronic provider message to extract live videos attributes indicative of the type of live video, and the date and time of the performance; and link the video database entry attributes to the live video entry.

20. An electronic system comprising:

one or more processing devices; and one or more machine-readable hardware storage devices storing instructions that are executable by the one or more processing devices to:

receive a request from a client system of a consumer for a provider to conduct a specific type of live performance;

determine availability of providers associated with a brokerage service for conducting the specific type of live performance;

send a response comprising a listing of available providers having specified provider attributes to conduct the specific type of live performance;

receive specific performance attributes that are embedded in the specific type of live performance; and cause establishment of a communication channel for electronic transmission of a live, real-time video that displays the performance of the selected provider, with the connection being between the client system of the consumer and a system of the selected provider of the live, real-time video.

21. The electronic system of claim 20 wherein the one or more machine-readable hardware storage devices included instructions to:

enable the consumer to search for providers that are providing streaming live videos at the time the consumer is searching for providers.

22. The electronic system of claim 20 wherein the one or more machine-readable hardware storage devices included instructions to:

retrieve video determination rules; and apply the retrieved video determination rules to video search attributes to determine live videos with attributes matching the specific performance attributes.

23. The electronic system of claim 22 wherein a first one of the video determination rules is a compare rule that compares the received specific performance attributes to sets of attributes of corresponding live performances that are linked to or associated with corresponding live video entries in the data repository.

24. The electronic system of claim 20 wherein instructions to receive the specific performance attributes that are embedded in the specific type of live performance are executed prior to establishment of the communication channel.

25. The electronic system of claim 20 wherein instructions to receive the specific performance attributes that are embedded in the specific type of live performance are executed while the live video is streaming.

26. The electronic system of claim 20 wherein the data repository comprises a plurality of live video entry records each associated with at least a provider, and associated with and/or linked through a pointer to with attributes of the live video, with the attributes of the live video including data that are indicative of the type of live video, the date and time of the real-time performance of the live video.

* * * * *